United States Patent [19]

MacDougall et al.

[11] Patent Number: 4,694,377
[45] Date of Patent: Sep. 15, 1987

[54] SEGMENTED CAPACITOR

[75] Inventors: Frederick W. MacDougall, Marion; Thomas A. Murphy, New Bedford, both of Mass.

[73] Assignee: Aerovox Incorporated, New Bedford, Mass.

[21] Appl. No.: 868,295

[22] Filed: May 28, 1986

[51] Int. Cl.$^4$ ............................................. H01G 1/11
[52] U.S. Cl. .................................................. 361/275
[58] Field of Search ........ 361/272, 273, 275, 304–306, 361/308–310

[56] References Cited

U.S. PATENT DOCUMENTS

| | | | |
|---|---|---|---|
| 2,216,559 | 10/1940 | Ortlieb et al. | 361/304 |
| 3,654,532 | 4/1972 | Rayburn | 317/258 |
| 3,731,354 | 5/1973 | Rayburn | 29/25.42 |
| 3,859,592 | 1/1975 | Kessler | 361/275 X |
| 4,433,359 | 2/1984 | Hamabe et al. | 361/273 |
| 4,434,452 | 2/1984 | Hamabe et al. | 361/304 |
| 4,477,953 | 10/1984 | Lobo et al. | 361/309 X |
| 4,494,168 | 1/1985 | Kume et al. | 361/273 |

Primary Examiner—Donald A. Griffin

[57] ABSTRACT

A capacitor in which at least one of two dielectrically-insulated metal layers is interrupted along its length by a plurality of transverse non-conductive gaps extending partway across the layer, thereby dividing the layer into a series of conductive sections each conductive section being connected to an adjacent section by a narrow metallized region that extends between the associated gap and one edge of the layer; the narrow metallized regions is adapted to act as a fuse for the section during periods of excessive current flow to the section.

13 Claims, 6 Drawing Figures

SEGMENTED CAPACITOR

BACKGROUND OF THE INVENTION

This invention relates to capacitors, especially wound metallized film capacitors.

The dielectric separating the charged layers of a wound capacitor deteriorates with use, finally breaking down completely, resulting in a localized short and consequent increases in local current density. This condition may lead to catastrophic failure in which the capacitor bursts or catches fire.

To prevent such failures, it is known to incorporate within the capacitor a fusing portion which responds to increases in local current density by disconnecting the failed section of metallized film prior to catastrophic failure.

SUMMARY OF THE INVENTION

A general feature of the invention is a capacitor in which at least one of two dielectrically-insulated metal layers is interrupted along its length by a plurality of transverse non-conductive gaps extending partway across the layer, thereby dividing the layer into a series of conductive sections each conductive section being connected to an adjacent section by a narrow metallized region that extends between the associated gap and one edge of the layer; the narrow metallized region is adapted to act as a fuse for the section during periods of excessive current flow to the section.

Preferred embodiments of the invention include the following features. The conductive section extends to the edge of the layer and has an exent along the lengthwise direction of the layer that is greater than the widthwise extent of the narrow metallized region. In some embodiments, the gaps extend to the opposite edge of the layer and the conductive section is connected to the two adjacent sections respectively by two narrow metallized regions that act as parallel fuses that must both fuse in order to electrically isolate the section from the adjacent sections. In other embodiments, the gaps do not extend to the outer edge of the layer, so that the section is also connected to an adjacent section by a second narrow metallized region extending between the gap and that other edge, with the second narrow region acting as a second parallel fuse. A conductive material (e.g., endspray), applied along the edge, acts as an additional parallel fuse along a length of the edge that corresponds to the section. A margin extends along the length of the layer between the edge and the ends of the gaps and the margin is uninterrupted. In some embodiments, the capacitor is wound as a roll with the gaps formed by a cut passing through the roll. In some embodiments, the layer is patterned to form the gaps. The second metal layer has a corresponding arrangement of sections and gaps. The two layers are oriented so that at one end of the capacitor, one edge of the first layer is exposed while one edge of the second layer is inset so as not to be exposed, and at the other end of the capacitor, the other edge of the second layer is exposed while the other edge of the first layer is inset; conductive material is applied to the capacitor ends for making electrical contact to the exposed edges. In the cut embodiments, the cut may extend fully to one end of the roll but stop sufficiently short of the other end to provide the narrow metallized regions along one edge of both layers; alternately the cut may stop sufficiently short of both ends of the roll to provide the narrow metallized regions along both edges of both layers. The narrow metallizes region is from 1 to 30% of the width of the layer.

As advantages of the invention, effective fusing is provided inexpensively and internally to the capacitor, and the tendency of premature disconnection is reduced, particularly when fusing is provided both by the conductive end coating and by the narrow metallized regions.

Other features and advantages of the invention will be apparent from the following description of the preferred embodiment, and from the claims.

DESCRIPTION OF THE PREFERRED EMBODIMENT

We first briefly describe the drawings.

DRAWINGS

STRUCTURE, MANUFACTURE, AND USE

Figure 1:
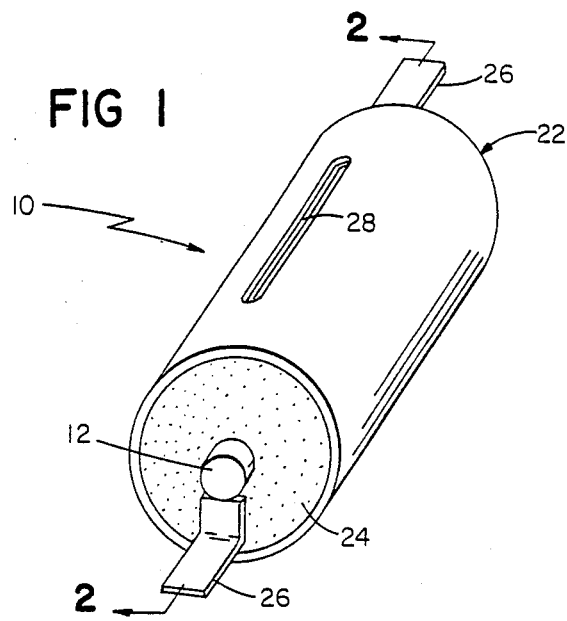
FIG. 1 is a perspective view of a preferred embodiment.
Figure 3:
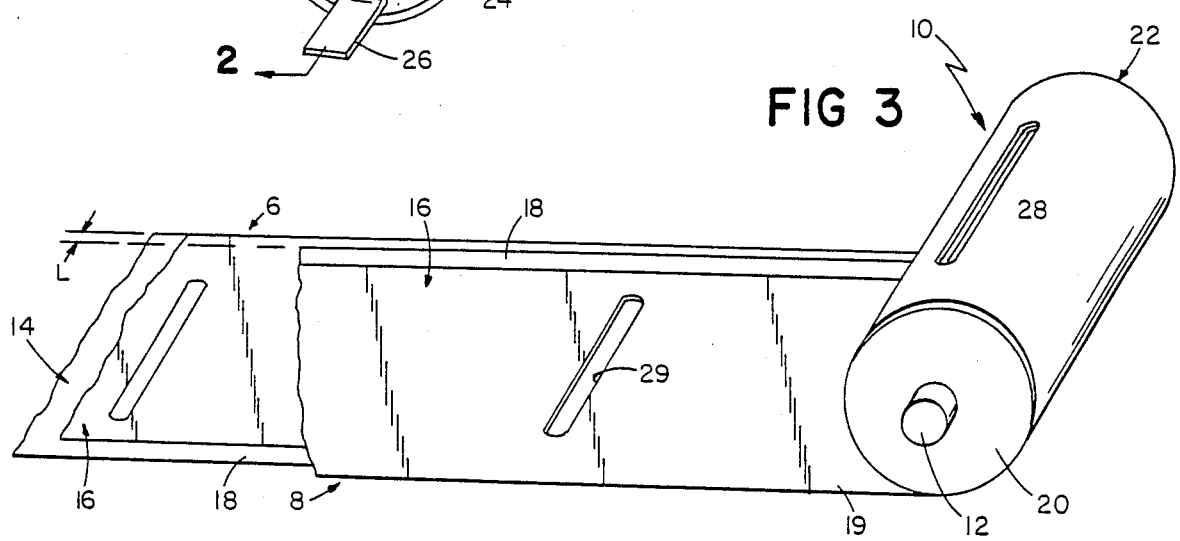
FIG. 3 is a perspective view, partially unrolled.

Referring to FIGS. 1 and 3, capacitor 10 is formed by winding two metallized dielectric strips 6, 8, which form the electrodes, around a nonconducting core 12 made from an injection-molded thermoplastic. Strips 6, 8 (25–125 mm wide) overlap except for a lateral offset L (preferably 0.5 to 2 mm). Each comprises metallized film consisting of a polypropylene substrate 14 on which a thin (preferably 100–500 Angstroms) aluminum layer 16 is deposited (e.g., as supplied by Steiner Film). A metal-free margin 18 (preferably 0.5 to 5 mm wide) is provided along one edge of each strip. Strips 6, 8 are oriented during winding so that their metal-free margins are on opposite ends 20, 22 of the wound capacitor. Ends 20, 22 are flame or arc sprayed with vaporized zinc 24 (or tin/zinc, tin/lead, or aluminum) to a thickness of preferably 0.010" to 0.030" to provide electrical contact with the electrodes.

Figure 4:
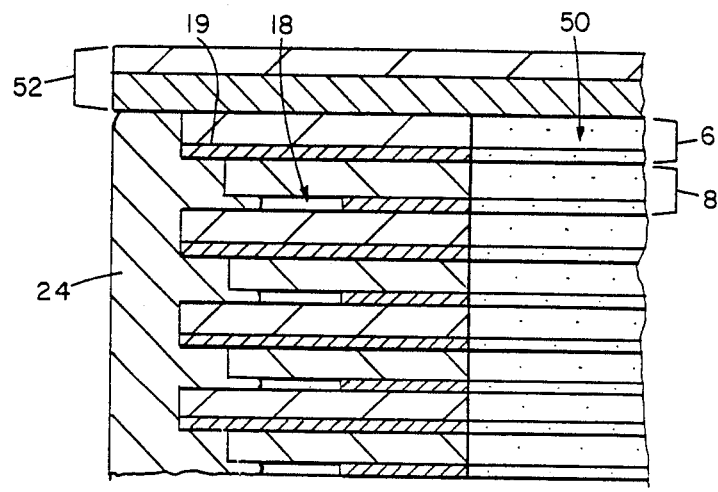
FIG. 4 is an enlarged diagrammatic view of a portion of FIG. 2.

Referring to FIGS. 1 and 4, end-spray 24 contacts the metallized margin 19 of electrode strip 6, but only the metal-free margin 18 of electrode strip 8. Connector tabs 26 are lead soldered or welded to end-spary regions 24, for making electrical connections to the capacitor.

Figure 5:
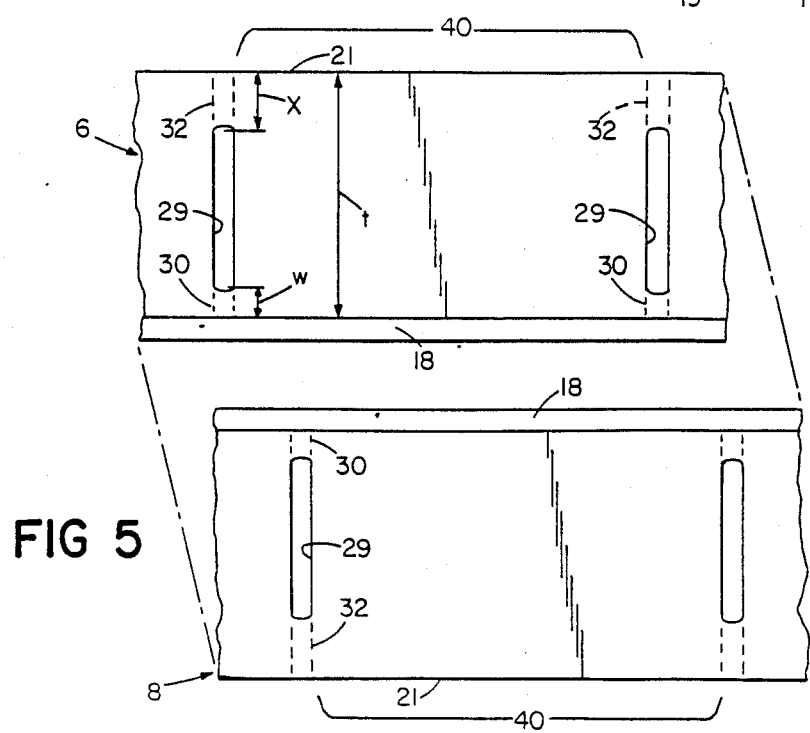
FIG. 5 is an exploded view of a short length of the two metallized dielectric strips of FIG. 3.
Figure 2:
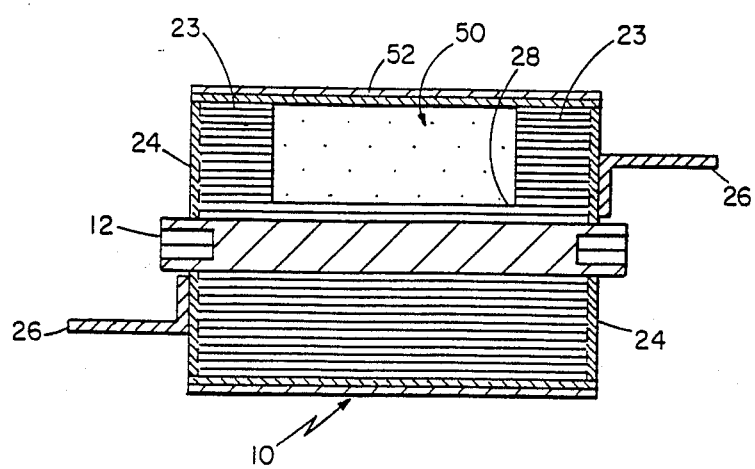
FIG. 2 is a cross-sectional view at 2—2 in FIG. 1.

Referring to FIGS. 2 and 5, an end-milled radial cut 28, oriented transversely to electrode strips 6, 8 penetrates capacitor windings 20 from outer surface 29 to core 12. The cut does not extend far enough in the transverse direction to sever either metal-free margin 18, and leaves intact adjacent each metal-free margin 18 narrow regions 30 of metallization, and adjacent the other edges 21 of the metal layers of strips 6, 8, narrow regions 22 of metallization. Cut 28 produces gaps 29 on themetal layers of strips 6, 8. Because current flowing around a gap 29 through regions 30, 32 has an increased current density, the length of a gap 29 and the resulting sizes of regions 30, 32 become instrumental in selecting desired current densities, and hence fusing capabilities, of regions 30, 32. The length of a gap 29 is adjusted so that the width w of region 30 (extending from margin 18 to the end of gap 29) on both electrodes is, e.g., 5% of the total metallized width t. The width x of region 32 is greater than w. Gaps 29 define a series of metallized sections 40. Each section 40 extends to edge 21 and is connected to the two adjacent sections 40 by regions 30, 32.

Referring to FIG. 2, cut 28 is packed with nonconductive, air-impereable material 50, e.g., a wax-like blend of polybutene and polyethylene or polyurethane resin, and capacitor 10 is encased by a protective air-impermeable material 52, e.g., plastic heat-shrink tubing, a plastic or metal canister, or epoxy resin.

In use, capacitor 10 is connected to an electric circuit via connector tabs 26. Regions 30, 32 provide conductive current pathways allowing the capacitor to continue functioning in the event that endspray contact at edge 21 is lost in the region of one of the sections 40 as the result of a localized internal short on that section. If the short heals itself, as often occurs with metallized film, no further fusing action will occur. If, however, the short does not heal, the continued high current flow will vaporize first regions 30 and then regions 32. Once all four regions 30, 32 associated with a section 40 on one of the layers 6 or 8 have vaporized the section 40 where the short occurred will be isolated, while permitting the remainder of the capacitor to continue to operate. Thus, the end-spray connection and the four fusing regions can be seen as connected in parallel.

Figure 6:
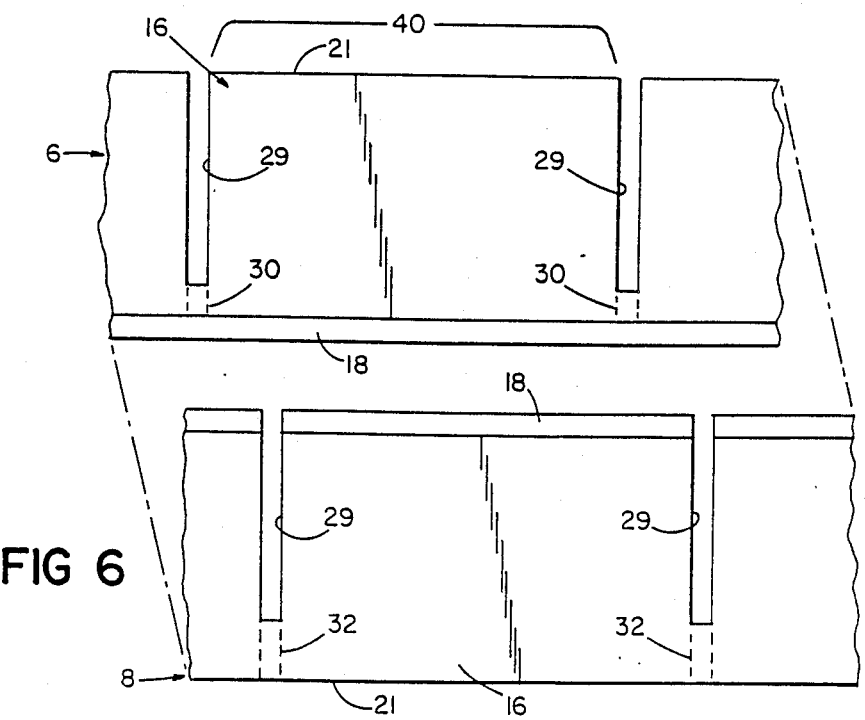
FIG. 6 is an exploded view of another embodiment.

Other embodiments are within the following claims. For example, capacitor 10 can be wound without a core 12; a wound capacitor with or without a core can be pressed into an oval profile; cut 28 may extend beyond one, but not both metallized margins as shown in FIG. 6; cut 28 may be produced using a circular saw, milling machine, bandsaw, or a laser; the width of fusible regions 30, 32 is preferably 1% to 30% of the total metallized width; and the metallized coating may be evaporated in a pattern to define gaps 29, rather than cutting the capacitor after it is rolled.

What is claimed is:

1. A capacitor comprising:
a dielectric strip,
first and second metal layers insulated from one another by said dielectric strip,
each of said layers being interrupted along its length by a plurality of transverse non-conductive gaps extending partway across said layer,
said gaps dividing each said layer into a series of conductive sections, each section being connected to an adjacent section by a narrow metallized region extending from the associated said gap to one edge of said layer, said narrow metallized region being adapted to act as a first fuse for said section during periods of excessive current flow to said section and wherein
the sections of each said layer are all electrically connected in common along one edge of said layer.

2. The capacitor of claim 1 wherein said section extends to said edge and has an extent along the lengthwise direction of said layer greater than the widthwise extent of said narrow metallized region.

3. A capacitor comprising:
a dielectric strip,
first and second metal layers insulated from one another by said dielectric strip,
at least one of said layers being interrupted along its length by a plurality of transverse non-conductive gaps extending partway across said layer,
said gaps dividing said layer into a series of conductive sections, each section being connected to an adjacent section by a narrow metallized region extending between the associated said gap and one edge of said layer, said narrow metallized region being adapted to act as a first fuse for said section during periods of excessive current flow to said section, and wherein
said gaps extend to the opposite edge of said layer, and
said section is connected to the two adjacent sections located on either side of said section, respectively by two said narrow metallized regions adapted to act as parallel fuses which must both fuse in order to electrically isolate said section from said adjacent sections.

4. A capacitor comprising:
a dielectric strip,
first and second metal layers insulated from one another by said dielectric strip,
at least one of said layers being interrupted along its length by a plurality of transverse non-conductive gaps extending partway across said layer,
said gaps dividing said layer into a series of conductive sections, each section being connected to an adjacent section by a narrow metallized region extending between the associated said gap and one edge of said layer, said narrow metallized region being adapted to act as a first fuse for said section during periods of excessive current flow to said section, and wherein
said gaps do not extend to the other edge of said layer, and
said section is also connected to said adjacent section by a second said narrow metallized region extending between said gap and the other edge of said layer, and adapted to act as a parallel second fuse, such that both first and second fuses must fuse in order to electrically isolate said sector from said adjacent sector.

5. The capacitor of claim 1, 3, or 4, further comprising a conductive material applied along said edge for making electrical content to the capacitor, said conductive material being adapted to act as an additional parallel fuse along a length of said edge that corresponds to said section,
whereby said additional fuse must also fuse in order to electrically isolate said section.

6. The capacitor of claim 1 wherein a margin extends along the length of said layer between said one edge and the ends of said gaps and said margin is uninterrupted.

7. The capacitor of claim 1, 3, or 4 wound in a roll with said gaps formed by a cut passing through said roll.

8. The capacitor of claim 1, 3, or 4 wherein said layer is patterned to form said gaps.

9. The capacitor of claim 1, 3, or 4 wherein said second metal layer comprises a corresponding arrangement of sections and gaps.

10. The capacitor of claim 9 wherein,
said first and second metal layers are oriented so that
at one end of said capacitor one edge of the first layer is exposed while one edge of the second layer is inset so as not to be exposed, and
at the other end of said capacitor, the other edge of said second layer is exposed while the other edge of said first layer is inset, and
conductive material is applied to said capacitor ends for making electrical contact to said exposed edges.

11. The capacitor of claim 7 wherein said cut extends fully to one end of said roll but stops sufficiently short of other end to provide said narrow metallized regions along one edge of each of said layers.

12. The capacitor of claim 7 wherein said cut stops sufficiently short of both ends of said roll to provide said narrow materiallized regions along both edges of both said layers.

13. The capacitor of claim 1 wherein said narrow metallized region forming said first fuse in from 1 to 30% of the width of said layer.

* * * * *